United States Patent
Guo et al.

(10) Patent No.: US 7,752,641 B2
(45) Date of Patent: Jul. 6, 2010

(54) DISK APPARATUS

(75) Inventors: Bin-Hai Guo, Shenzhen (CN); Chien-Ting Lo, Tu-Cheng (TW); Li-Ming Wan, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 1371 days.

(21) Appl. No.: 11/196,972

(22) Filed: Aug. 4, 2005

(65) Prior Publication Data

US 2006/0107272 A1 May 18, 2006

(30) Foreign Application Priority Data

Nov. 12, 2004 (CN) .................. 2004 2 0095304 U

(51) Int. Cl.
*G11B 17/04* (2006.01)
(52) U.S. Cl. ....................... 720/619; 720/651
(58) Field of Classification Search ............... 720/619, 720/622, 600, 601, 635, 657
See application file for complete search history.

(56) References Cited

U.S. PATENT DOCUMENTS

| 5,995,468 | A  | * | 11/1999 | Furukawa ............. 720/607 |
| 6,061,320 | A  |   | 5/2000  | Tsai |
| 6,229,781 | B1 | * | 5/2001  | Fujisawa ............. 720/603 |
| 6,335,914 | B2 | * | 1/2002  | Tanaka et al. ......... 720/608 |
| 6,704,266 | B2 |   | 3/2004  | Yanagiguchi |
| 6,880,159 | B2 | * | 4/2005  | Konno et al. .......... 720/605 |
| 2003/0214896 | A1 | * | 11/2003 | Konno et al. .......... 369/75.2 |
| 2004/0154029 | A1 | * | 8/2004  | Nishidate ............. 720/605 |
| 2004/0163092 | A1 | * | 8/2004  | Makisaka et al. ....... 720/619 |

* cited by examiner

*Primary Examiner*—William J Klimowicz
*Assistant Examiner*—Carlos E Garcia
(74) *Attorney, Agent, or Firm*—Jeffrey T. Knapp

(57) ABSTRACT

A disk apparatus includes a bracket, a loading motor, a gear unit, and a slider cam. The loading motor is attached to the bracket. The gear unit is installed in the bracket and is connected with the loading motor for power transmission from the loading motor. The slider cam is transversely movable between a transverse loading/unloading position and a transverse reading position. The slider cam operatively mates with the gear unit and slidably engages with the bracket at a first cam portion and a second cam portion thereof. The first cam portion is engageable with the bracket in a plane different from the second cam portion.

19 Claims, 3 Drawing Sheets

DISK APPARATUS

BACKGROUND

1. Field of the Invention

The present invention is generally related to a disk apparatus for recording information on and/or reproducing information from a disk such as a CD and a DVD and, more particularly, to a disk loading mechanism of the disk apparatus that performs loading and unloading of a disk.

2. Related Art

In recent years, disk type data storage devices such as optical disk drive have been widely used. In order to upgrade the performance of the disk type data storage device, manufacturers have been continuously upgrading the rotation speed of the spindle motor of the device to increase the speed of reading and writing data. Meanwhile, the recording densities of disks have been undergoing continued increase for obtaining a larger capability to contain data. Therefore, it has been required that the disk type data storage devices should have a high stability so as to perform the clear reading and writing data from or onto disks.

A loading mechanism is one of the most important parts of a disk type data storage device, which is used to perform loading a disk into and unloading of a disk out of the disk type data storage device. The operational stability of the loading mechanism is one matter impacting the stability of the disk type data storage device.

A conventional loading mechanism includes a frame, a set of gears, a transmission unit and a pivoting base. Two pole portions are formed on the frame, and the transmission unit includes two longitudinal grooves slidably receiving the pole portions of the frame. The transmission unit further includes a rack for engaging with the set of gears and a Z-shaped groove for receiving a pin of the pivoting base therein. In operation, the set of gears engages with the rack of the transmission unit, pushing the transmission unit to move along the longitudinal direction thereof. The moving transmission unit drives the pivoting base sliding upward or downward.

However, in the above-mentioned loading mechanism, the stability of the transmission unit is poor when moving along the longitudinal direction to push the pivoting base to slide upward or downward. This poor stability does not satisfy the operating requirements for the high-speed and high-density disk apparatus.

Therefore, a heretofore unaddressed need exists in the industry to address aforementioned deficiencies and inadequacies associated with the operational stability of the loading mechanism.

SUMMARY OF THE INVENTION

One embodiment of the present invention provides a disk apparatus. The disk apparatus includes a bracket, a loading motor, a gear unit, and a slider cam. The loading motor is attached to the bracket. The gear unit is installed in the bracket and is connected with the loading motor for power transmission from the loading motor. The slider cam is movable in a transverse movement between a transverse loading/unloading position and a transverse reading position. The slider cam operatively mates with the gear unit and slidably engages with the bracket at a first cam portion and a second cam portion. The first cam portion is operative with the bracket in a plane different from the second cam portion.

BRIEF DESCRIPTION OF THE DRAWINGS

Many aspects of the invention can be better understood with reference to the following drawings. The components in the drawings are not necessarily to scale, the emphasis instead being placed upon clearly illustrating the principles of the present invention. Moreover, in the drawings, like reference numerals designate corresponding parts throughout the several views.

DETAILED DESCRIPTION OF PREFERRED EMBODIMENT

Hereinafter, an embodiment of a disk apparatus according to the present invention will be described in detail with reference to the accompanying drawings.

Figure 1:
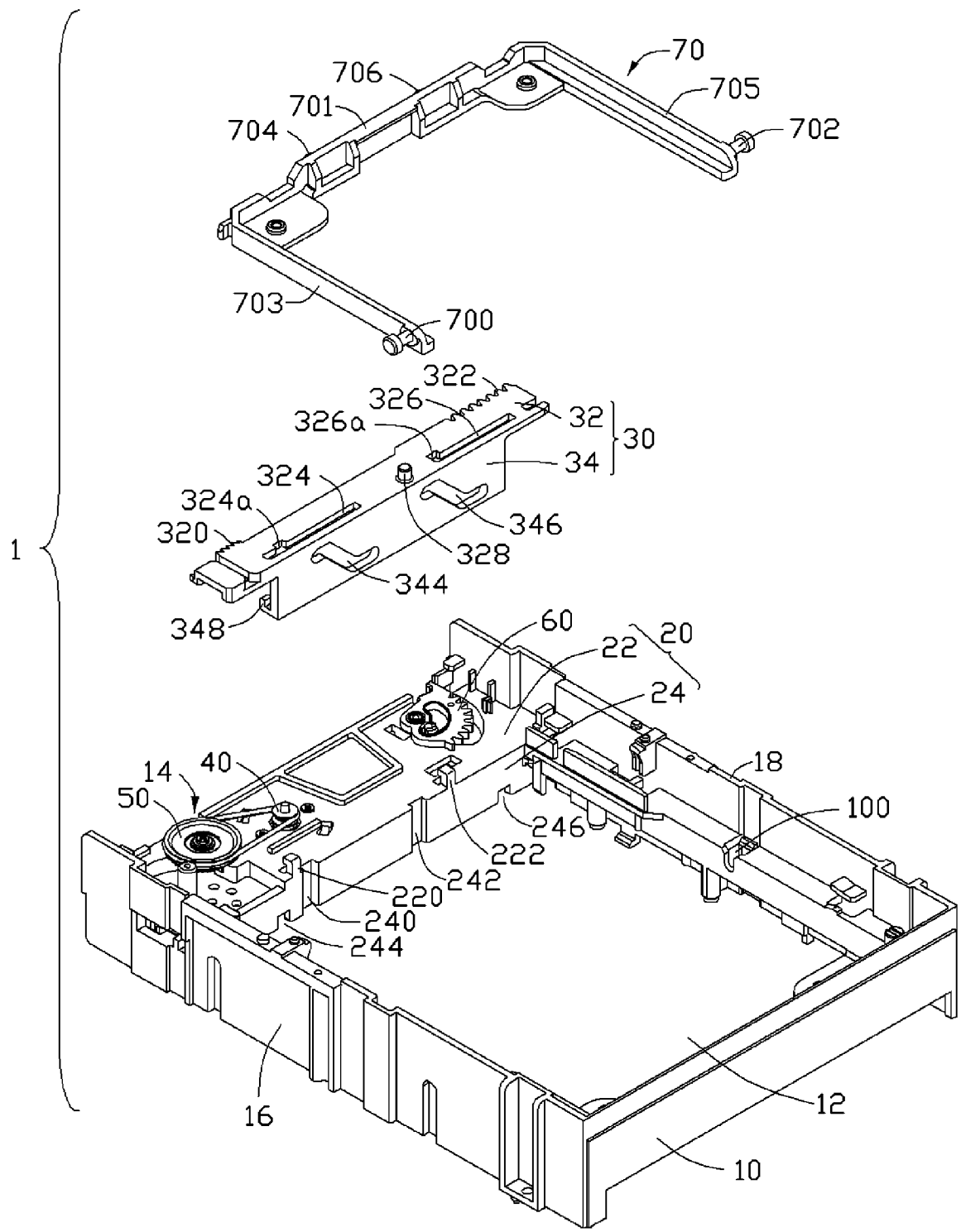
FIG. 1 is an exploded, isometric view of a disk apparatus according to a preferred embodiment of the present invention, viewed from a rear side thereof.
Figure 2:
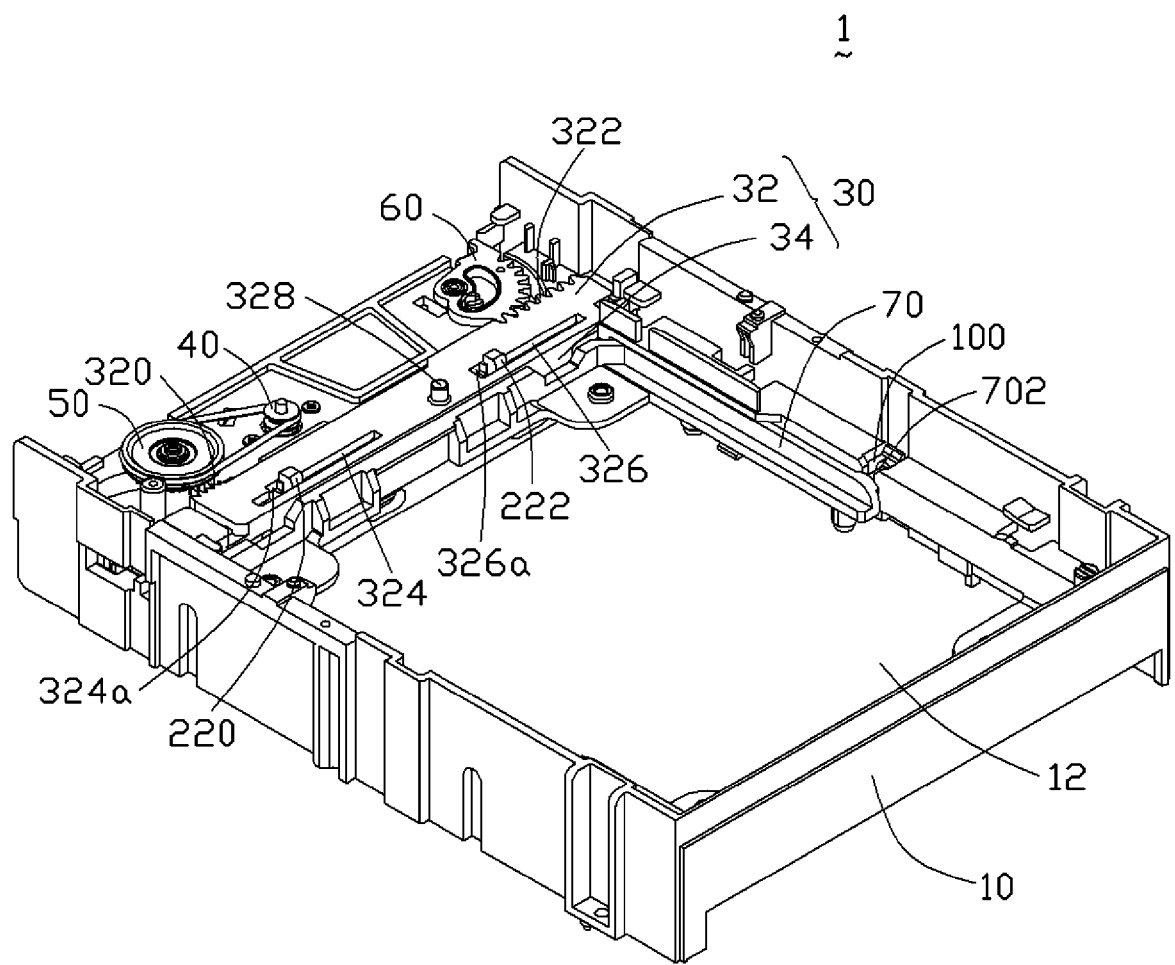
FIG. 2 is an assembled, isometric view of the disk apparatus of FIG. 1.
Figure 3:
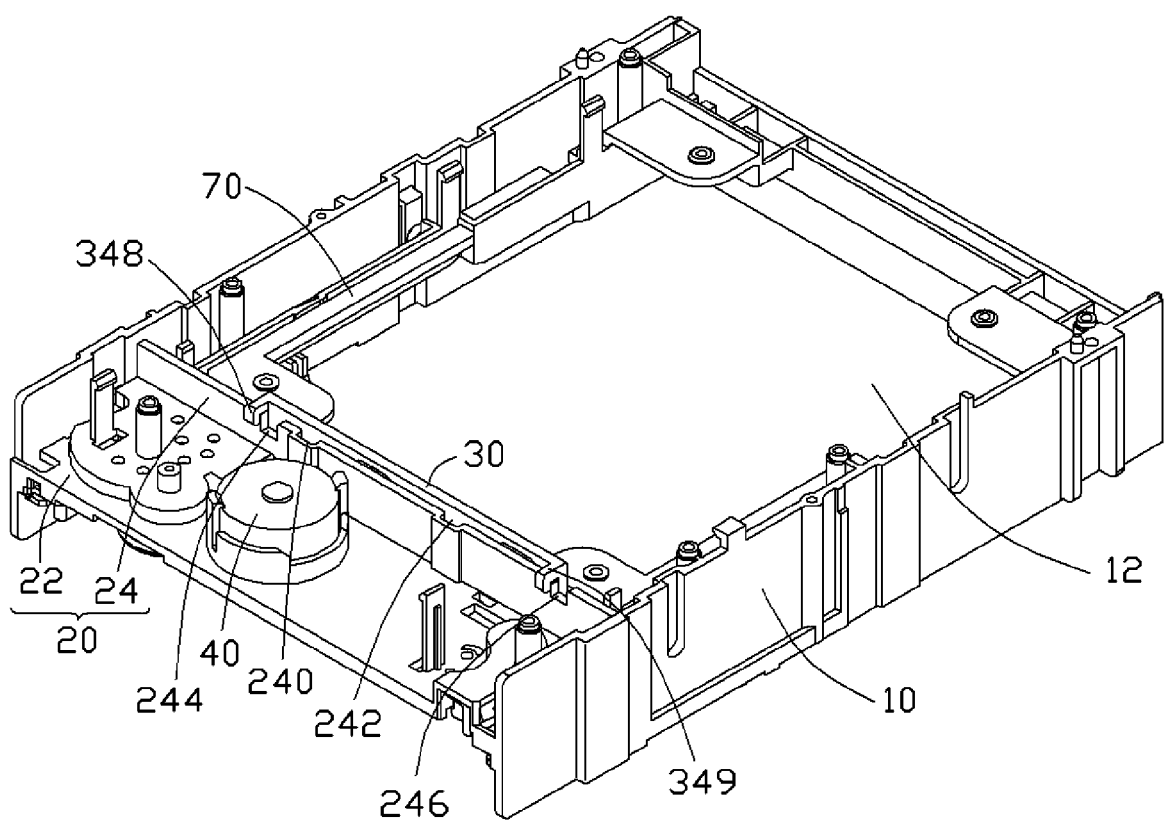
FIG. 3 is an isometric view of the disk apparatus of FIG. 2, viewed from a bottom aspect thereof.

As shown in FIGS. 1-3, the disk apparatus 1 of the embodiment of the present invention includes a main body (not shown), a frame 10, and a loading mechanism 14. The main body is for reading information from and/or recording information to a disk (not shown). The frame 10 has an opening 12 for receiving the main body therein, and the loading mechanism 14 is attached to the frame 10 for loading and unloading a disk into and out of the disk apparatus 1. The frame 10 includes two opposite frame walls 16, 18 and a bracket 20 interconnecting the opposite walls 16, 18 at a front side of the frame 10. Each of the opposite walls 16, 18 of the frame 10 has a recess 100 for engaging with the loading mechanism 14. The bracket 20 includes a base plate 22 and a sidewall 24 extending downward from a rear side of the base plate 22 to form an edge of the opening 12. A pair of first clasping portions 220 and 222 extends upward from the rear side of the base plate 22 for engaging with the loading mechanism 14. Two parallel spacing grooves 240 and 242 are vertically defined in the sidewall 24. Two cuts 244 and 246 are defined at the bottom of the sidewall 24. Each cut 244 and 246 has a depth larger than the height of each first clasping portion 220 and 222 for assembling the loading mechanism 14 with the bracket 20.

The loading mechanism 14 includes a loading motor 40, a gear unit 50, a manual ejection gear 60, and a slider cam 30. The loading motor 40 acts as a source of driving power for moving a tray (not shown) into and out of the disk apparatus 1. The slider cam 30 engages with the gear unit 50 and the manual ejection gear 60 for lifting the main body up and down. The loading motor 40 is installed in the base plate 22 of the bracket 20, and the gear unit 50 is located next to the loading motor 40. The gear unit 50 is connected with the loading motor 40 via a strip (not labeled) for power transmission from the loading motor 40. The manual ejection gear 60 is arranged on the base plate 22 of the bracket 20 for performing the loading and unloading the disk via manual operation.

The slider cam 30 is engageably attached to the bracket 20 and is transversely movable between a loading/unloading position and a reading position. The slider cam 30 includes a horizontal portion 32 and a vertical portion 34 perpendicularly extending downward from a long side (not labeled) of the horizontal portion 32. Two guide grooves 324 and 326 are defined in the horizontal portion 32, with two mounting holes 324a and 326a communicating with corresponding guide grooves 324 and 326. A protrusion 328 is formed on the horizontal portion 32 and located between the two guide grooves 324 and 326 for respectively engaging with the tray. A first and second rack 320 and 322 are formed at opposite ends of another long side (not labeled) of the horizontal portion 32 for engaging with the gear unit 50 and manual ejection gear 60, respectively. The vertical portion 34 of the slider cam 30 includes two cam slant grooves 344, 346 facing the corresponding spacing grooves 240 and 242. Two second clasping portions 348 and 349 are formed at a bottom of the vertical portion 34. The distance between the two second clasping portions 348 and 349 substantially equals the distance between the two cam slant grooves or cuts 344 and 346.

A U-shaped pivoting base 70 for lifting and lowering the main body includes a crossbeam 701, two parallel side beams 703 and 705, pivots 700 and 702, and two guide pins 704 and 706. The two side beams 703 and 705 connect with opposite ends of the crossbeam 701, respectively. Each side beam 703 and 705 has free end, and pivots 700 and 702 extend perpendicularly outwardly from the corresponding side beam 703 and 705. Two guide pins 704 and 706 protrude from the crossbeam 701 for engaging with the slider cam 30, each guide pin or post 704, 706 extending through a particular cam slant groove 344, 346.

In assembly of the disk apparatus 1, the loading motor 40 and the gear unit 50 are attached to the base plate 22 of the bracket 20. The slider cam 30 is disposed on the bracket 20, leaning against the base plate 22 and the sidewall 24. The first clasping portions 220 and 222 are received in the corresponding mounting holes 324a and 326a, and the second clasping portions 348 and 349 contact the top edges of the corresponding cuts 244 and 246. The vertical portion 34 is deformed by an applied thrust or force, and then the horizontal portion 32 and the vertical portion 34 face the base plate 22 and the sidewall 24 of the bracket 20, respectively. Subsequently, the slider cam 30 is slid a predetermined distance along the bracket 20, and the manual ejection gear 60 is fixed on the bracket 20 and engages with the second rack 322 of the slider cam 30. The slider cam 30 is then slidably fixed on the bracket 20. Thus, the slider cam 30 is attached to the bracket 20 with the first clasping portion 220 and 222 slidably engaging with the corresponding guide grooves 324 and 326 and the second clasping portions 348 and 349 slidably catching the lower side of the sidewall 24. Therefore, the slider cam 30 can slide left/right along the base plate 22 of the bracket 20.

The first rack 320 is engaged with the gear unit 50 for power transmission from the loading motor 40. The pivots 700 and 702 of pivoting base 70 are rotatably accommodated in the recess 100 of a given opposite frame wall 16, 18, so that the pivoting base 70 can be rotated along an axis defined by pivots 703 and 705. Two guide pins 704 and 706 of the pivoting base 70 slidably received in the corresponding spacing groove 240 and 242 after running though the corresponding slant grooves 344 and 346.

In operation, the disk apparatus 1 performs a movement as follows. The loading motor 40 is activated and drives the gear unit 50. The gear unit 50 engages with the first rack 320 of the slider cam 30, pushing the slider cam 30 in the transverse movement along the bracket 20. The protrusion 328 of the slider cam 30 engages with the tray, pushing the tray backward into a reading position for reading a disk or forward into a loading/unloading position for loading or unloading a disk. At the same time, the slant grooves 344 and 346 push the guide pins 704 and 706 upward or downward, so as to lift up the main body into a reading position or lower the main body into a loading/unloading position.

In the above-mentioned disk apparatus 1, there are two engagements between the slider cam 30 and bracket 20 to slidably attach the slider cam 30 to the bracket 20. One engagement is between the guide grooves 324 and 326 formed on the horizontal portion 32 of the slider cam 30 and first clasping portions 220 and 222 formed on the base plate 22. The other engagement is between the second clasping portions 348 and 349 of the slider cam 30 and the lower side of the sidewall 24 of the bracket 20. Hence, due to the two engagements, even if the width of the horizontal portion 32 of the slider cam 30 is reduced, the slider cam 30 can still stably move along the bracket 20. Therefore, the stability of the disk apparatus can be improved. Additionally, the shortened horizontal portion 32 of the slider cam 30 could allow the width of the base plate 22 to be decreased, and then the size of the main body could, in turn, be allowed to increase. The increase of the size of main body would expectedly reduce vibrations when the disk apparatus is working, and such a size increase should further improve the stability of the disk apparatus 1.

It should be emphasized that the above-described embodiment of the present invention is merely a possible example of the implementation of the present invention and is merely set forth to provide a clear understanding of the principles of the invention. Many variations and modifications may be made to the above-described embodiment of the invention without departing substantially from the spirit and principles of the invention. All such modifications and variations are intended to be included herein within the scope of this disclosure and the present invention and protected by the following claims.

What is claimed is:

1. A disk apparatus comprising:
   a bracket;
   a loading motor attached to said bracket;
   a gear unit installed in said bracket and connected with said loading motor for power transmission from said loading motor;
   a slider cam engaging with said gear unit and slidably mounting with said bracket, said slider cam having a first cam portion and a second cam portion, said bracket being engaged at said first cam portion and at said second cam portion, said first cam portion being engageable with said bracket in a different plane from said second cam portion, said slider cam thereby being transversely movable between a transverse loading/unloading position and a transverse reading position;
   wherein the bracket comprises a base plate and a sidewall extending from a side of the base plate, the base plate of the bracket has at least one clasping bracket portion extending therefrom, the at least one clasping bracket portion clasps the first cam portion on the base plate, and the second cam portion comprises at least one clasping cam portion at a lower side, the at least one clasping cam portion clasps a lower side of the sidewall of the bracket to attach the second cam portion to the sidewall.

2. The disk apparatus as recited in claim 1, wherein said slider cam further comprises a horizontal portion at which said first cam portion is formed and a vertical portion at which said second cam portion is formed.

3. The disk apparatus as recited in claim 1, wherein said at least one clasping bracket portion of said bracket is formed proximate a joining portion of said base plate and said sidewall.

4. The disk apparatus as recited in claim 1, wherein at least one cut is defined at a low side of said sidewall, each said cut having a depth larger than a height of said at least one clasping portion of said bracket.

5. The disk apparatus as recited in claim 1, wherein the first cam portion comprises at least one guide groove for being clasped by the at least one clasping bracket portion, said slider cam further comprises at least one mounting hole communicating with said at least one guide groove.

6. The disk apparatus as recited in claim 1, further comprising a frame and a pivoting base, said frame carrying said bracket, said pivoting base including two ends rotatably joined with said frame.

7. The disk apparatus as recited in claim 6, wherein said slider cam further comprises a horizontal portion at which said first cam portion is formed and a vertical portion at which said second cam portion is formed, said bracket further comprising at least one spacing groove, said sidewall vertically extending from a side of said base plate, at least one said spacing groove being formed in said sidewall, said slider cam further comprising at least one slant groove formed in said vertical portion thereof, said pivoting base including at least one guide post, said at least one guide post running through a given said slant groove and extending into a given said spacing groove.

8. A disk apparatus comprising:
a bracket including a base plate and a sidewall, said base plate having at least one clasping bracket portion extending therefrom;
a loading motor attached to said bracket;
a gear unit installed in said bracket and connected with said loading motor for power transmission from said loading motor;
a slider cam integrally formed and engaging with said gear unit and slidably mounting with said bracket, said slider cam comprising at least one guide cam groove and at least two clasping cam portions, at least one said clasping bracket portion passing through the at least one guide cam groove and slidably hooking on the slider cam, the at least two clasping cam portions engaging said sidewall, said sidewall has a sidewall bottom which is located on the far end of the sidewall from the base plate, at least one said clasping cam portion hooks on said sidewall bottom.

9. The disk apparatus of claim 8, wherein said slider cam further comprises a first cam portion and a second cam portion, the at least one guide cam groove is defined in said first cam portion, the at least two clasping cam portions are disposed on the second cam portion.

10. The disk apparatus of claim 9, wherein said first cam portion and the second cam portion are horizontal and vertical, respectively, and connect with each other.

11. The disk apparatus of 1, wherein the first cam portion defines at least one guide groove, the at least one clasping bracket portion passes through the guide groove to hook on the first cam portion.

12. The disk apparatus of 1, wherein the slider cam comprises a vertical portion at which the second cam portion is formed and a horizontal portion at which the first cam portion is formed.

13. The disk apparatus of claim 8, wherein each of the at least two clasping cam portions and the at least one clasping bracket portion is a hook.

14. The disk apparatus of claim 13, wherein the at least one guide cam groove is elongated parallel with the sidewall.

15. The disk apparatus of claim 14, wherein the slider cam further meshes with an ejection gear configured to engage with a tray.

16. A disk apparatus comprising:
a frame comprising opposite walls and a bracket connecting the opposite walls, and defining an opening between the opposite walls, the bracket comprising a base plate and a sidewall extending from the base plate for connecting with the opposite walls to form an edge of the opening;
a loading motor attached on the bracket;
a gear unit installed in said bracket and connected with said loading motor for power transmission from said loading motor;
a slider cam engaged with the gear unit and slidably mounting on the bracket, the slider cam comprises a first cam portion engaged with the base plate and a second cam portion comprising a clasping cam portion so as to clasp on the sidewall, the slider cam thereby being transversely movable between a transverse loading/unloading position and a transverse reading position.

17. The disk apparatus of claim 16, wherein the clasping cam portion is a hook.

18. The disk apparatus of claim 16, wherein the clasping cam portion is disposed at an edge of the sidewall far away from the base plate.

19. The disk apparatus of claim 18, further comprising a pivoting base, said pivoting base including two ends rotatably attached to said frame, wherein at least one spacing groove is defined in the sidewall, and at least one slanted groove is defined in the second cam portion, the pivoting base including at least one guide post, said at least one guide post extending through the at least one slanted groove and received in the at least one spacing groove.

* * * * *